Patented June 18, 1946

2,402,440

UNITED STATES PATENT OFFICE 2,402,440

ART OF MANUFACTURING AROMATIC AMINES

John J. Owen, Baton Rouge, La., assignor to Standard Oil Development Company, a corporation of Delaware No Drawing. Application September 30, 1943, Serial No. 504,381

4 Claims. (Cl. 260—580)

The present invention relates to improvements in the art of manufacturing aromatic amines by reduction catalytically of the corresponding nitro-aromatic compound and, more particularly, it relates to catalysts which are adapted to promote and accelerate this reaction.

Recently it has been discovered that aromatic nitro-compounds are valuable blending agents in the manufacture of aviation gasoline since they impart to said gasoline an improved rich mixture performance under high power output.

Heretofore, for the most part, aromatic amines, such as aniline, have been reduced from the corresponding aromatic nitro-compound by hydrogen in the presence of tin or iron and a dilute aqueous solution of a mineral acid such as HCl. This reaction runs smoothly in producing aniline from nitro-benzene but has not proved entirely satisfactory in reducing nitro-xylenes to xylidines.

I have now discovered that metallic copper or copper sulfide supported on Activated Alumina provides an excellent catalyst for the hydrogenation or reduction of nitro-aromatic compounds. This is particularly true in the reduction of nitro-xylenes.

The main object of my present invention, therefore, is to provide an efficient process for conducting the hydrogenation of aromatic amines, including the use of a suitable catalyst.

A more specific object of my invention is to provide a process for reducing or hydrogenating nitro-xylenes.

Other and further objects of my invention will appear from the following more detailed description and claims.

The gist of my invention, as indicated, resides primarily in the discovery of catalysts suitable for use in reducing nitro-aromatics. I shall not describe in detail a commercial operation with all of the steps which are necessary to carry out such a process. Instead, I shall point out that my catalyst may be used in any feasible hydrogenation process, as, for example, that disclosed in the application of Edwin J. Gohr et al., Serial No. 499,768, filed August 24, 1943. This application contains a full description of an apparatus and preferred operating conditions for carrying out the catalytic reduction of nitro-xylenes. My catalyst can be used in such a process with good results or, as indicated, it may be used in any other known practical commercial operation leading to the production of xylidines by reduction of nitro-xylenes.

As previously indicated, I have discovered a process for reducing nitro-aromatics using metallic copper or copper sulfide supported on an inert carrier or extender, such as, for example, pumice, silica gel, ceramic material, clays, kieselguhr, or the like. Activated Alumina, alumina gel and a commercial "aluminum hydrate" manufactured and sold by the Natural Products Company have been found to be satisfactory supporters.

As to details of preparing the catalyst, it is first pointed out that the carrier or support is impregnated with a copper salt, such as copper sulphate, copper nitrate, or other water-soluble copper salt, and thereafter the impregnated carrier is heated to decompose the salt to the oxide. The catalyst is then used as such or may be treated with hydrogen sulfide or carbon disulfide, preferably in situ in the reaction zone. Or the oxide catalyst may be reduced to the metallic state with hydrogen prior to being placed in the hydrogen reactor, or it may be reduced in situ. However, preliminary reduction of the catalyst is not necessary.

I shall now set forth specific examples illustrating a preferred method of preparing my catalyst with the understanding that the precise details I am about to enumerate are purely illustrative and do not impose any limitation on my invention.

Example 1

A catalyst was prepared by impregnating 4–8 mesh "Activated Alumina" at room temperature with a 50% by weight aqueous solution of copper nitrate trihydrate to give 10% of CuO in the finished catalyst. The impregnated material was dried in an oven at 300° F. and then heated for 12 hours at 800–850° F. to decompose the nitrates.

When a continuous feed consisting of 27 weight per cent nitro-xylenes and 73 weight per cent methylcyclohexane was passed continuously over the above catalyst at a total feed rate of 2 volumes of feed per volume of catalyst per hour and at a catalyst temperature of 400° F. in the presence of industrial hydrogen at 2700 lbs./sq. in. pressure, the nitro-xylenes were converted completely to xylidines and the latter were continuously recovered.

Example 2

In another run conducted at the same feed rate and using the same catalyst and hydrogen pressure as in Example 1 but at a temperature of 441° F., the nitro-xylenes in a feed consisting of 28 weight per cent nitro-xylenes and 72 weight per cent alkylate safety fuel were essentially converted to xylidines.

Example 3

A feed consisting of pure nitro-benzene when treated in an autoclave with hydrogen at 2650 pounds pressure at 450° F. in the presence of 33 weight per cent of a catalyst similar to that used in Example 1 was 99% converted to aniline in 1 hour.

Example 4

A catalyst was prepared by impregnating a purified, dried silica gel with copper nitrate solution so that the finished, dried catalyst contained the equivalent of 10% copper as the oxide. The nitrate was decomposed to the oxide by heating to 850° F. When a feed consisting of 20 volume per cent nitro-xylenes and 80 volume per cent cyclohexane was treated in an autoclave with industrial hydrogen at 2600 lbs./sq. in. pressure at 420° F. for one hour in the presence of 33 weight per cent of this catalyst, the nitro-xylenes were essentially completely converted to xylidines.

Example 5

In another run a technical grade of nitro-benzene was heated in an autoclave for 8 hours at 400° F. in the presence of a catalyst containing copper oxide on kieselguhr. The nitro-benzene was converted to aniline to the extent of 98.5% of the original charge.

Example 6

A catalyst prepared in the manner described in Example 1 was sulfided by treating the oxide with a continuous stream of hydrogen sulfide at 700–800° F. for six hours. A feed consisting of 20 volume per cent of nitro-xylenes in 80 volume per cent of methylclohexane was treated in an autoclave for 3 hours at 450° F. with industrial hydrogen in the presence of 33 weight per cent of the sulfided catalyst. All of the nitro-xylenes were converted to xylidines.

The catalysts which I have prepared are adapted for catalyzing the reduction of nitro-xylenes to xylidines in vapor phase operation. That is to say, they have proved by test to be active catalysts in this type of operation. On the other hand, in the liquid phase type of operation, in order to improve the mechanical strength of the catalyst, as, for example, where the support is Activated Alumina, I prefer to treat the Activated Alumina with acetic acid before impregnation with the copper salt and thereafter to mix the alumina with clay which latter constituent improves the mechanical strength. The treatment with acetic acid improves the activity of the catalyst.

Numerous modifications of my invention may be made by those who are familiar with this art without departing from the spirit thereof.

What I claim is:

1. The method of reducing aromatic nitro compounds to the corresponding aromatic amine which comprises passing the vaporized aromatic nitro compound, with hydrogen, at elevated temperatures and pressures over a catalyst consisting of copper sulfide supported on an inert carrier and providing a sufficient period of time to effect the desired conversion, and recovering the desired product from the reaction zone.

2. The method of reducing nitro-xylene which comprises contacting the vaporized nitro-xylene and, hydrogen, in a reaction zone with a catalyst consisting of copper sulfide supported on an inert carrier, at elevated temperatures and pressures providing a sufficient period of time to effect the desired conversion and recovering xylidine from said reaction zone.

3. The method specified in claim 2 in which the inert carrier is alumina.

4. The method of claim 2 in which the catalyst consists of copper sulfide on alumina.

JOHN J. OWEN.